US011328272B2

(12) United States Patent
Williams et al.

(10) Patent No.: US 11,328,272 B2
(45) Date of Patent: *May 10, 2022

(54) AUTOMATED ENROLLMENT OF A USER IN AN AUTOMATIC UPDATING PROGRAM

(71) Applicant: Mastercard International Incorporated, Purchase, NY (US)

(72) Inventors: Kyle Williams, Wentzville, MO (US); David J. Senci, Troy, IL (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 214 days.

This patent is subject to a terminal disclaimer.

(21) Appl. No.: 16/853,364

(22) Filed: Apr. 20, 2020

(65) Prior Publication Data

US 2020/0250637 A1   Aug. 6, 2020

Related U.S. Application Data

(63) Continuation of application No. 15/796,447, filed on Oct. 27, 2017, now Pat. No. 10,628,809.

(51) Int. Cl.
*G06Q 20/10* (2012.01)
*G06Q 20/24* (2012.01)
(Continued)

(52) U.S. Cl.
CPC .......... *G06Q 20/102* (2013.01); *G06Q 20/14* (2013.01); *G06Q 20/24* (2013.01); *G06Q 20/4097* (2013.01)

(58) Field of Classification Search
CPC ...... G06Q 20/102; G06Q 20/14; G06Q 20/24; G06Q 20/4097
See application file for complete search history.

(56) References Cited

U.S. PATENT DOCUMENTS 8,595,134 B2   11/2013   Kelly et al.
10,163,147 B2 *  12/2018   Lee .................... G06Q 30/0631
(Continued)

FOREIGN PATENT DOCUMENTS

WO        2010028454 A1    3/2010
WO    WO-2010028454 A1 *  3/2010  ............. G06Q 20/04
(Continued)

OTHER PUBLICATIONS

GoeMerchant Team: Boost Revenue with Account Updater for Recurring Billing, Mar. 2, 2016, goEmerchant Payment Processing, pp. 1-7 (Year: 2016).*

(Continued)

*Primary Examiner* — Bijendra K Shrestha
(74) *Attorney, Agent, or Firm* — Armstrong Teasdale LLP

(57) ABSTRACT

An auto-enrollment billing updater (AEBU) computing device for enrolling enrollees in an automatic updating program is provided. The AEBU computing device is configured to receive, from an acquirer computing device, an account update request for updated account data for a set of account identifiers including an input acquirer identifier and an input merchant identifier, perform a lookup within a transaction database using a combination of the input acquirer identifier and the input merchant identifier, wherein the transaction database includes transaction data involving a plurality of cardholders and a plurality of merchants, identify as a merchant enrollee the merchant included within the transaction database having a stored acquirer identifier and a stored merchant identifier combination that matches the input acquirer identifier and the input merchant identifier combination included in the request, and automatically enroll the merchant enrollee in the automatic updating program when the merchant enrollee is identified.

17 Claims, 4 Drawing Sheets

(51) Int. Cl.
*G06Q 20/14* (2012.01)
*G06Q 20/40* (2012.01)

(56) References Cited

U.S. PATENT DOCUMENTS

| | | |
|---|---|---|
| 2012/0166270 A1 | 6/2012 | Coppinger |
| 2013/0041736 A1 | 2/2013 | Coppinger |
| 2013/0041739 A1 | 2/2013 | Coppinger |
| 2013/0041743 A1 | 2/2013 | Coppinger |
| 2013/0041744 A1 | 2/2013 | Coppinger |
| 2013/0041745 A1 | 2/2013 | Coppinger |
| 2013/0046599 A1 | 2/2013 | Coppinger |
| 2013/0046600 A1 | 2/2013 | Coppinger |
| 2013/0046608 A1 | 2/2013 | Coppinger |
| 2013/0117087 A1 | 5/2013 | Coppinger |
| 2013/0185192 A1* | 7/2013 | McGuire ............ G06Q 20/384 705/39 |
| 2014/0156520 A1 | 6/2014 | Kelly et al. |
| 2015/0356556 A1* | 12/2015 | Celikyilmaz .......... G06Q 20/40 705/14.51 |
| 2018/0114203 A1* | 4/2018 | Senci .................. G06F 21/6245 |
| 2018/0114204 A1 | 4/2018 | Rosano et al. |

FOREIGN PATENT DOCUMENTS

| | | | |
|---|---|---|---|
| WO | 2018075202 A1 | 4/2018 | |
| WO | WO-2018075202 A1 * | 4/2018 | ......... G06Q 20/4016 |

OTHER PUBLICATIONS

Verifi: What every card not present shoud know: Navigating today's challenging payments ecosystem, 2014, pp. 1-33 (Year: 2014).*
Jewell, Nigel: Card Ease MPI: Credit Call Card Payment Solutions, Nov. 2014, Credit Call Limited, pp. 1-11. (Year: 2014).*
Incognico ePayments: Transaction Statuses and Errors, May 5, 2014, ingenico.com, pp. 1-3. (Year: 2014).
Kjos, Ann: The Merchant-Acquiring Side of the Payment Card Industry: Structure, Operations, and Challenges, Discussion Paper, Payment Cards Center, Federal Reserve Bank of Philadelphia, Oct. 2007, pp. 1-29. (Year 2007).

* cited by examiner

AUTOMATED ENROLLMENT OF A USER IN AN AUTOMATIC UPDATING PROGRAM

CROSS-REFERENCE TO RELATED APPLICATIONS

This application is a continuation application of U.S. patent application Ser. No. 15/796,447, filed Oct. 27, 2017, entitled "AUTOMATED ENROLLMENT OF A USER IN AN AUTOMATIC UPDATING PROGRAM", the disclosure of which is incorporated herein by reference in its entirety.

BACKGROUND

The present disclosure relates generally to information networks and, more particularly, to computer systems and computer-based methods for automatically enrolling users in an automatic updating program such as an automatic account updating program.

Computer networks offer systems that will update data used by users of said systems. However, in order to receive this updated data, the user typically has to enroll in the update system. Enrolling in such update systems can be tedious and time consuming.

For example, in the payment industry, individuals may repeatedly transact with a single merchant, such as a repeat customer or by way of recurring payments. A repeat transaction may be triggered at regularly scheduled intervals or upon occurrence of an event, for example, the balance reaching a predetermined threshold. It has become common for individuals to enroll with merchants with whom they expect to have repeat transactions for goods and services using a payment card. Once enrolled, when making a transaction, the individual need not reenter personal data and payment card data. Instead, the merchant may attempt to complete a transaction using the already submitted personal and payment card data. These transactions are known as "card-not-present" (CNP) transactions. In such transactions, data from the payment card including account identifiers, such as personal account numbers (PANs), and, in many instances, an expiration date for the payment card is transmitted from a merchant, along with an indicator that the transaction is a CNP transaction. An "account-on-file" transaction is another type of transaction in which the merchant stores data regarding the cardholder's payment card in a database, then retrieves the stored payment card data and includes it in a payment authorization request. One specific type of account-on-file transaction is a "recurring payment transaction," which a merchant initiates on a recurring basis for a particular cardholder. In such recurring payment transactions, the merchant stores data regarding the cardholder's payment card in a database, then retrieves the stored payment card data and includes it in each recurring authorization request.

During an authentication phase of a transaction, the personal account data may be used by authenticating entities to authenticate the transaction. Entities involved in the authentication process may include, for example, the issuing bank that issued the payment card to the cardholder, the merchant, and/or the acquirer bank that authorizes payment card transaction and transfers money on behalf of the merchant. These activities may be coordinated by a payment processing system that includes a payment processor. In some instances, the issuing bank and the acquirer bank compare personal account data associated with the cardholder for verification purposes before authorizing the transaction. However, when the personal account data stored by the issuing bank and the acquirer bank do not match, such as due to an update of personal account data with only one of the authenticating entities, the transaction may be denied.

When a cardholder's personal account data changes, transactions may be denied unless updates are shared with each authentication entity. The process for updating personal account data can be time consuming and may be prone to error. What is more, the updating process may be performed haphazardly since cardholders do not typically have a comprehensive list of parties that they have enrolled with for future or recurring transactions. Missing an update may cause denial of an important payment, potentially causing further complications and penalty fees.

To prevent these interruptions, merchants may wish to enroll in a program providing access to updated account data. In at least some of these known account update systems, a merchant must enroll with the system to receive updates. These known systems require merchant enrollment in an account updating program to be initiated by the merchant's acquirer bank. The acquirer bank may initiate merchant enrollment by submitting request files to the account updating program or by manually completing and submitting enrollment paperwork. Acquirers must submit enrollment forms that include a variety of merchant identifying information. Current methods of merchant enrollment are time consuming and prone to error. There is therefore a need to automate merchant enrollment in an account updating program.

BRIEF DESCRIPTION

In one aspect, an auto-enrollment billing updater (AEBU) computing device for enrolling enrollees in an automatic updating program is provided. The AEBU computing device includes one or more processors in communication with one or more memory devices. The AEBU computing device is configured to receive, from an acquirer computing device, an account update request for updated account data, the account update request including an input acquirer identifier and an input merchant identifier. The AEBU computing device is further configured to perform a lookup within a transaction database using a combination of the input acquirer identifier and the input merchant identifier, wherein the transaction database includes transaction data involving a plurality of cardholders and a plurality of merchants. The AEBU computing device is further configured to identify as a merchant enrollee the merchant included within the transaction database having a stored acquirer identifier and a stored merchant identifier combination that matches the input acquirer identifier and the input merchant identifier combination included in the request. The AEBU computing device is further configured to automatically enroll the merchant enrollee in the automatic updating program when the merchant enrollee is identified.

In another embodiment, a computer-implemented method for enrolling enrollees in an automatic updating program is provided. The method is implemented using an auto-enrollment billing updater (AEBU) computing device. The method includes receiving, by the AEBU computing device, a request from an acquirer computing device for updated account data, the account update request including an input acquirer identifier and an input merchant identifier, and performing a lookup within a transaction database using a combination of the input acquirer identifier and the input merchant identifier, wherein the transaction database includes transaction data involving a plurality of cardholders and a plurality of merchants. The method further includes identifying, by the AEBU computing device, as a merchant enrollee the merchant included within the transaction database having a stored acquirer identifier and a stored merchant identifier combination that matches the input acquirer identifier and the input merchant identifier combination included in the request, and automatically enrolling the merchant enrollee in the automatic updating program when the merchant enrollee is identified.

In still another embodiment, a non-transitory computer readable medium that includes computer-executable instructions for enrolling enrollees in an automatic updating program is provided. When executed by at least one processor of an auto-enrollment billing updater (AEBU) computing device, the computer executable instructions cause the at least one processor to receive, from an acquirer computing device, an account update request for updated account data, the account update request including an input acquirer identifier and an input merchant identifier, and perform a lookup within a transaction database using a combination of the input acquirer identifier and the input merchant identifier, wherein the transaction database includes transaction data involving a plurality of cardholders and a plurality of merchants. The computer executable instructions further cause the at least one processor to identify as a merchant enrollee the merchant included within the transaction database having a stored acquirer identifier and a stored merchant identifier combination that matches the input acquirer identifier and the input merchant identifier combination included in the request, and automatically enroll the merchant enrollee in the automatic updating program when the merchant enrollee is identified.

BRIEF DESCRIPTION OF THE DRAWINGS

FIG. 1 is a schematic diagram illustrating a payment platform having an auto-enrollment billing updater (AEBU) computing device.

FIG. 2 is a schematic diagram illustrating an exemplary multi-party network system that includes the AEBU computing device shown in FIG. 1 for enrolling merchants in an account updating program.

FIG. 3 is a diagram illustrating an example of the AEBU computing device shown in FIGS. 1 and 2.

FIG. 4 is a flow chart illustrating an example method for enrolling merchants in an account updating program using the AEBU computing device shown in FIGS. 1 and 2 in accordance with one example embodiment of the present disclosure.

DETAILED DESCRIPTION

Figure 1:
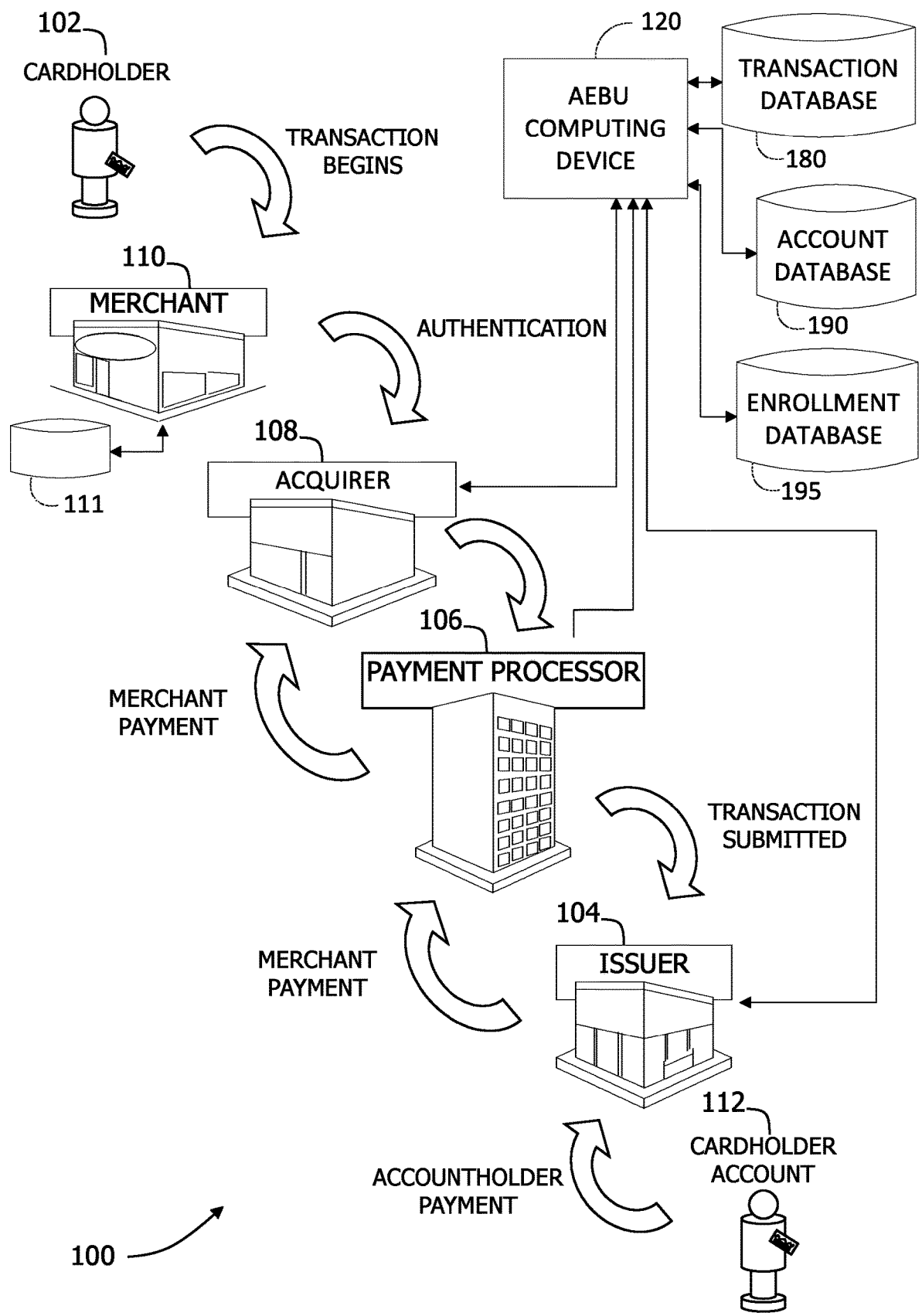
FIGS. 1-4 show example embodiments of the methods and systems described herein.

The systems and methods described herein are directed to an auto-enrollment billing updater (AEBU) computing device for automatically enrolling merchants in an account updating program. The AEBU computing device periodically receives account data and account data updates from one or more issuers, and maintains the account data in an AEBU account database. Account data and account data updates are associated with unique account identifiers, such as personal account numbers (PANs). Account data and account data updates may include a PAN, an expiration date, and/or other data associated with the payment card and/or cardholder.

The AEBU computing device is also in communication with a payment processor, and aggregates and stores transaction data. The transaction data may include a list of account identifiers (e.g., PANs), a list of merchants with which the account identifiers have transacted, and a corresponding list of acquirer banks wherein each merchant is associated with an acquirer bank. In an example embodiment, the transaction database stores transactions as rows and associated searchable key variables are stored as columns, wherein the associated searchable key variables may include a merchant identifier, an acquirer identifier, transaction dates and times, the physical addresses associated with transactions (e.g., shipping addresses, merchant addresses, etc.), transaction amounts, etc. In another example embodiment, the transaction data is indexed within the transaction database by merchant, and thus each merchant in the transaction database is associated with a list of account identifiers. Transaction data may also include transaction dates and times, the physical addresses associated with transactions (e.g., shipping addresses, merchant addresses, etc.), transaction amounts, etc. The AEBU computing device stores transaction data in the transaction database. The transaction data may be stored together with the account data or in a separate database (i.e., the transaction database may be the same as the account database or separate from the account database). The transaction data may include transactions completed within a specified window of time (e.g., within the past ninety days). The merchants associated with the transaction data may be identified using merchant transaction identifiers. These merchant transaction identifiers may be similar to the identifiers found in cardholder transaction summaries, such as those that might appear in account statements or bills. The AEBU computing device also stores account updating program data in an enrollment database. Data stored within the enrollment database can be used by the AEBU computing device to determine if a merchant has enrolled in the account updating program. Data in the enrollment database may include a merchant enrollment identifier, the physical address associated with a merchant, the acquirer bank associated with a merchant, and a list of account identifiers with which the merchant has transacted. Enrollment data may be stored together with the account and/or transaction data or in a separate database.

Currently, for a merchant to enroll in an account updating program and receive updated account data, an associated acquirer must submit an enrollment request on the merchant's behalf. Once a merchant is enrolled in the account updating program, a requesting party, such as an acquirer, may submit an update request to the AEBU computing device on behalf of the merchant. However, merchant enrollment usually requires manual completion and transmission of paperwork, can take several days to process, and may be prone to error. Moreover, outright failure of the merchant to be enrolled in an account updating program creates the technical problem or issue of a recurring transaction being denied (i.e., the transaction is not completed) and the related payments being declined or not made. An AEBU computing device is therefore needed that can automatically enroll merchants into an account updating program using data included in an acquirer-submitted update request to prevent these technical problems or issues from occurring.

The AEBU computing device is configured to receive a request from an acquirer computing device for updated account data for a set of account identifiers. The acquirer computing device may be associated with an acquirer bank or any entity that processes transactions on behalf of a merchant. In some embodiments, an update request may include a combination of an acquirer interbank card association (ICA) number and a merchant transaction identifier. ICA numbers are four-digit numbers assigned by a payment processor to the acquirer to identify the acquirer in transactions. Merchant transaction identifiers may be similar to the identifiers found in cardholder transaction summaries, such as those that might appear in account statements or bills. In some embodiments, the acquirer and merchant identifiers may correspond with the names of the acquirer and merchant, or may include strings of characters recognizable only to the AEBU computing device.

In some embodiments, the AEBU computing device is configured to receive a request for updated account data, retrieve data from the enrollment database, and determine if the merchant is already enrolled in the account updating program. If the merchant is enrolled, the AEBU computing device may send updated account data to the acquirer. For example, if the update request includes a combination of an acquirer ICA number and a merchant identifier that matches a combination of an acquirer ICA number and a merchant identifier in the enrollment database, the AEBU computing device may generate an AEBU response message including the updated account data and transmit the message to the requesting acquirer.

The inclusion of the acquirer ICA number in the update request may be necessary because different acquirers may use the same merchant identifiers for different merchants. For example, Kyle's Shoe Store may be given 0101 as a merchant identifier by acquirer World Bank, whose ICA number may be 2020. Dave's Mattress Emporium may also be given 0101 as a merchant identifier by Nation Bank, whose ICA number may be 3030. In this example, an update request for merchant 0101 may be ambiguous without inclusion of an associated ICA.

If the AEBU computing device determines that the merchant is not already enrolled in the account updating program, the AEBU computing device may be further configured to retrieve, from the transaction database, transaction data associated with one or more merchants, the transaction data including one or more combinations of an acquirer ICA number and merchant identifier. Thus, the AEBU computing device is configured to identify a merchant enrollee by determining a merchant from the transaction data associated with an acquirer ICA number/merchant identifier combination that correlates with the acquirer ICA number/merchant identifier combination included in the request. The AEBU computing device is further configured to automatically enroll the identified merchant enrollee into the account updating program. In some embodiments, the AEBU computing device is further configured to update the enrollment database with data associated with the newly enrolled merchant. In some embodiments, the AEBU computing device may generate an AEBU merchant identifier for the merchant enrollee. The AEBU merchant identifier may be used in future account update requests and may be stored with other merchant data in the enrollment database. The AEBU computing device may include the AEBU merchant identifier in an AEBU response message transmitted to the requesting acquirer.

Assigning an AEBU merchant identifier has the technical benefit of preventing a single merchant with multiple merchant transaction identifiers from having to enroll with the AEBU computing device multiple times. The AEBU merchant identifier may be mapped to each merchant identifier associated with the merchant in the transaction database that is also associated with acquirer ICA number included in the update request.

In some embodiments, the AEBU computing device is configured to receive a request for updated account data and to further retrieve one or more lists of account identifiers from the transaction database, the one or more lists of account identifiers having been used to initiate a transaction with the one or more merchants associated with the one or more merchant identifiers. The AEBU computing device may be further configured to use the transaction data to identify a target set of account identifiers, wherein each member of the target set of account identifiers is both included in the account update request and is associated with the merchant enrollee identified in the transaction data. Identifying the target set of account identifiers may prevent supplying account data for accounts not associated with both the requesting acquirer and the merchant enrollee. The AEBU computing device may be further configured to retrieve, from the account database, updated account data and provide the requesting acquirer with updated account data for the target set of account identifiers. The updated account data may be included in an AEBU response message.

In some embodiments, the AEBU computing device is configured to receive a request for updated account data and to further generate and transmit an AEBU response message to the requesting acquirer that provides notice of successful enrollment of the merchant enrollee in the account updating program, and that provides the requested account data. In some embodiments, if a matching acquirer ICA number/merchant identifier combination is not found in the transaction data, the AEBU computing device is configured to generate and transmit an AEBU response message to the requesting acquirer that indicates the account data update request failed.

In certain embodiments, multiple account update requests for one or more merchants may be collected and submitted to the AEBU computing device in a batch. For example, an acquirer may collect multiple account update requests from one or more merchants and submit the account update requests as a batch to the AEBU computing device.

In some embodiments, data received by the acquirer in response to requests for updated account data may be transmitted to the merchant identified in the account update request.

The methods and systems described herein may be implemented using computer programming or engineering techniques including computer software, firmware, hardware or any combination or subset thereof, wherein the technical effect is achieved by performing at least one of: (a) receive an account update request for updated account data for a set of account identifiers, the account update request including an acquirer identifier and a merchant identifier; (b) retrieve transaction data associated with one or more merchants, the transaction data including one or more combinations of an acquirer identifier and merchant identifier; (c) attempt to identify a merchant enrollee by attempting to identify a merchant from the transaction data that is associated with an acquirer identifier/merchant identifier combination that matches the acquirer identifier/merchant identifier combination included in the request; and (d) automatically enroll the merchant enrollee in the automatic updating program when the merchant enrollee is identified.

The systems and methods described herein provide the technical advantages of (a) automating enrollment in an account updating program; (b) reducing the likelihood that account-on-file payment card transactions will be denied; (c) controlling and policing access to AEBU systems; and (d) increasing issuer participation in AEBU systems.

In one embodiment, a computer program is provided, and the program is embodied on a computer-readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to providing a system for automatically enrolling merchants in an account updating program.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

A payment card is a cashless payment device that may be embodied, for example, as a credit card, debit card, contactless RFID-enabled device including a smart card, Near-Field Communication enabled smartphone, electronic mobile wallet or the like. The payment card may be a device, real or virtual, by which the cardholder, as payer and/or source of funds for the payment, may be identified.

FIG. 1 is a schematic diagram illustrating a payment platform 100 that includes an auto-enrollment billing updater (AEBU) computing device 120. Embodiments described herein may relate to a transaction card system, such as a payment card payment system using the Mastercard® interchange network. The Mastercard® interchange network is a set of proprietary communications standards promulgated by Mastercard International Incorporated for the exchange of financial transaction data and the settlement of funds between financial institutions that are associated with Mastercard International Incorporated.

In a typical transaction card system, a financial institution referred to as the "issuer" 104 issues a transaction card, such as a credit card, debit card, and the like, to the consumer or cardholder 102, who uses the transaction card to tender payment for a purchase from merchant 110. To accept payment with the transaction card, merchant 110 normally establishes an account with a financial institution 108 that is part of the financial payment system. This financial institution is referred to as the "merchant bank," the "acquiring bank," or the "acquirer." In one embodiment, cardholder 102 uses a transaction card to tender payment for a purchase and merchant 110 then requests authorization from acquirer 108 for the amount of the purchase. The request is usually performed through the use of a point-of-sale terminal, which reads account data from a magnetic stripe, a chip, embossed characters, and the like, included on the transaction card of the cardholder 102 and communicates electronically with the transaction processing computers of acquirer 108. In the context of transactions with online merchants, cardholder 102 may provide account data, such as their personal account number (PAN), a card verification number, an expiration date, and the like through a website. Alternatively, acquirer 108 may authorize a third party to perform transaction processing on its behalf. In this case, a point-of-sale terminal may be configured to communicate with the third party. Such a third party may be referred to as a "merchant processor," an "acquiring processor," or a "third party processor."

Using a payment processor 106, computers of acquirer 108 may communicate with computers of issuer 104 to determine whether account 112 of cardholder 102 is in good standing and whether the purchase is covered by an available credit line of the account 112 corresponding to cardholder 102. Based on these determinations, the request for authorization may be declined or accepted. If the request is accepted, an authorization code may be issued to merchant 110.

Merchants, such as merchant 110, may store payment card account data corresponding to one or more cardholders in a cardholder account database 111. In certain embodiments, merchant cardholder account database 111 may be a local or remote database accessible by merchant 110. During a transaction, merchant 110 may retrieve account data from cardholder account database 111 as opposed to collecting the data from cardholder 102, such as by having cardholder 102 provide his or her payment card account data by swiping a payment card or manually entering payment card data. So called "account-on-file" transactions may include recurring payments such as subscription fees, membership fees, electronic bills, and the like. Account-on-file transactions may also include instances when cardholder 102 is a repeat customer of merchant 110. Accordingly, account-on-file transactions generally require a cardholder to provide his or her payment card account data initially and then to authorize or enroll in an account-on-file service. Once enrolled or authorized, subsequent payments by cardholder 102 may be streamlined by either automatically charging cardholder 102 or by automatically retrieving account data corresponding to cardholder 102 from merchant customer account database 111.

For example, merchant 110 may be an internet service provider (ISP) that provides internet connectivity to cardholder 102 in exchange for a monthly service fee. Cardholder 102 may enroll in an automatic bill pay service with the ISP to pay for the monthly service charge. The ISP may store cardholder's 102 account data in cardholder account database 111 and submit the monthly service charges to issuer 104. As another example, merchant 110 may correspond with an online merchant from which cardholder 102 makes regular purchases. Cardholder 102 may create a user profile with online merchant 110 and provide his or her payment card account data, which online merchant 110 may then store in cardholder account database 111. When cardholder 102 later logs onto online merchant's 110 website and selects goods or services for purchase, online merchant 110 may retrieve cardholder's 102 payment card account data from cardholder account database 111 and facilitate cardholder's 102 purchase by automatically populating purchase forms or performing similar steps with the retrieved account data.

Although account-on-file transactions improve efficiency for both merchants 110 and cardholders 102, payment card account data is subject to change. For example, a payment card's expiration date may lapse or issuer 104 may reissue a payment card with a different primary account number (PAN). If merchant 110 attempts to submit a transaction to issuer 104 for authorization after such a change and uses stale account data, issuer 104 is likely to reject the transaction. Accordingly, an AEBU computing device 120 may be used to ensure that account data maintained by merchant 110 is current, as described herein. Specifically, AEBU computing device 120 may receive payment card account data updates from one or more issuers, such as issuer 104, and store the received current payment card account data in an account database 190. Further, acquirer 108 may submit requests to AEBU computing device 120 for access to the updated account data in order to provide the updated account data to merchant 110. A granted request would provide acquirer 108 access to updated account data and would further allow acquirer 108 to forward the updated account data to merchant 110. Merchant 110 may update their respective cardholder account database 111 with the updated account data. In some embodiments, acquirer bank 108 may accumulate multiple update requests into a batch that is then submitted to AEBU computing device 120 for processing.

AEBU computing device 120 is also in communication with payment processor 106 to collect, aggregate, and store transaction data from a plurality of transactions. The transaction data is stored in a transaction database 180. The transaction data is data related to purchases made by the cardholder that are initiated with a merchant and are processed by the payment processor. The transaction data may include a list of account identifiers (e.g., PANs) and a list of merchants 110 with which the account identifiers have transacted. The transaction data is indexed within transaction database 180 by merchant, and thus each merchant 110 in transaction database 180 is associated with an individual list of account identifiers. Transaction data may also include transaction dates and times, the physical addresses (e.g., shipping address, merchant address, etc.) associated with transactions, transaction amounts, etc. Transaction database 180 may be the same as account database 190, or may be a separate database. The transaction data may also include transactions completed within a specified window of time (e.g., within the past ninety days). In the example embodiment, merchants 110 included with the transaction data are identified using merchant transaction identifiers. Merchant transaction identifiers may be similar to the identifiers found in cardholder 102 transaction summaries, such as those that might appear in account statements or bills.

AEBU computing device 120 also stores account updating program data in an enrollment database 195. Data stored within enrollment database 195 can be used by AEBU computing device 120 to determine if a merchant has enrolled in the account updating program, as described herein. Data in enrollment database 195 may include a merchant enrollment identifier, the physical address associated with a merchant, the acquirer bank associated with a merchant, and a list of account identifiers for transactions conducted with the merchant. Enrollment database 195 may be the same as transaction database 180 and/or account database 190, or may be a separate database.

AEBU computing device 120 is communicatively coupled to acquirer 108, or other requesting party, over a first network connection. AEBU computing device 120 is also communicatively coupled to issuer 104 over a second network connection. The first and/or second network connection may include, for example, a local area network (LAN) or a wide area network (WAN), dial-in-connections, cable modems, special high-speed integrated Services Digital Network (ISDN) lines; a wireless network adapter or a wireless data transceiver for use with a mobile phone network, Global System for Mobile communications (GSM), 3G, or other mobile data network or Worldwide Interoperability for Microwave Access (WIMAX). In some embodiments, ABU computing device 120 may be communicatively coupled to payment processor 106. In one embodiment, AEBU computing 120 device is in communication with or is a part of payment processor 106. Each network interface may be associated with IP address information (e.g., interface IP address and subnet) to enable the exchange of data.

Figure 2:
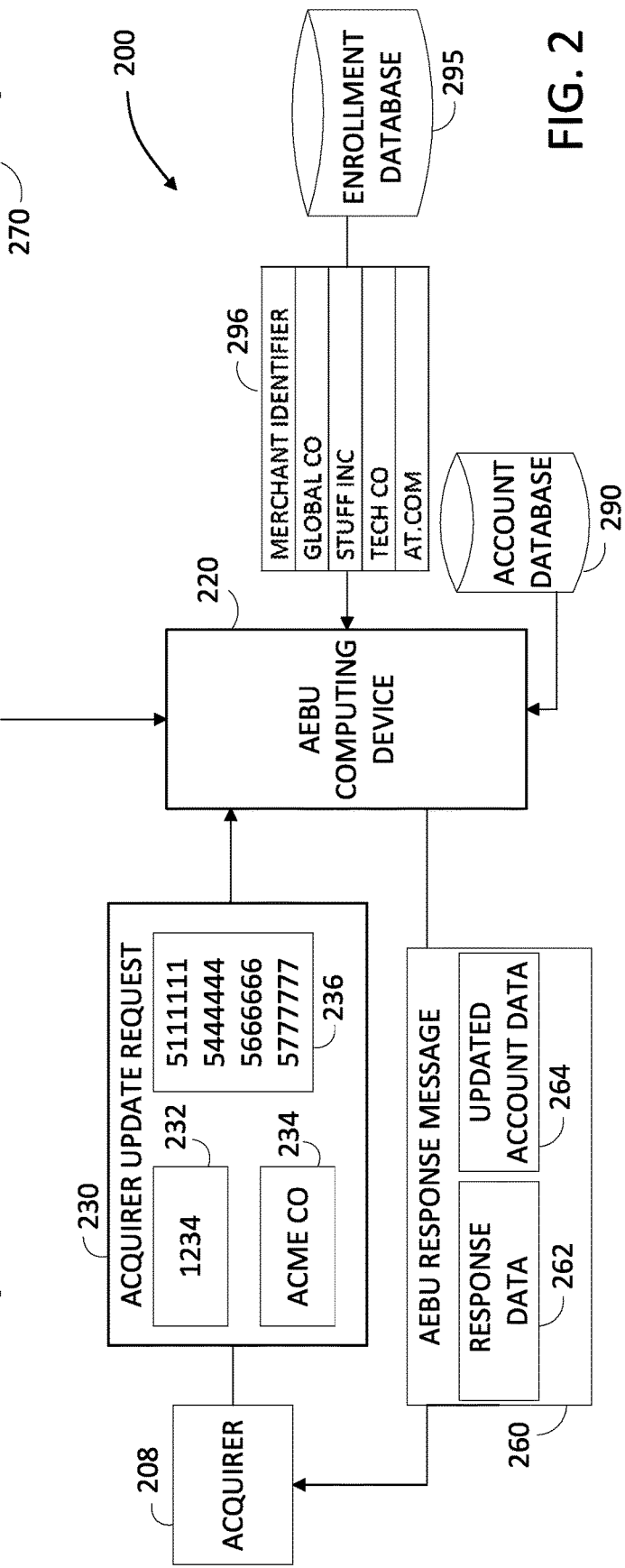

FIG. 2 is a schematic diagram illustrating an exemplary multi-party network system 200 including an AEBU computing device 220 for automatically enrolling merchants into an account updating program. In one embodiment, AEBU computing device 220 is similar to or the same as AEBU computing device 120 as shown in FIG. 1. If an acquirer 208, or other requesting party, wishes to update account data for a list of customer account identifiers, an account update request 230 is submitted to AEBU computing device 220 in the example embodiment. Merchant update request 230 includes a list of account identifiers 236 associated with the customer accounts for which acquirer 208 desires updated data. Account update request 230 may also include an acquirer identifier 232 and a merchant identifier 234. In the example embodiment, acquirer identifier 232 is a four digit acquirer ICA number, and merchant identifier 234 is associated with the merchant on whose behalf acquirer 208 is making the update request. In the example embodiment, merchant identifier 234 is a transaction identifier.

For example, account update request 230 might include acquirer identifier 232 "1234", merchant identifier 234 "ACME CO", and account identifier list 236 consisting of the following account identifiers: 5111111, 5666666, 5444444, and 5777777. This indicates that the acquirer whose ICA number is 1234 wishes to access updated account data for the accounts associated with account identifiers 5111111, 5666666, 5444444, and 5777777, and provide the updated account data to merchant ACME CO.

In some embodiments, upon receiving account update request 230, AEBU computing device 220 retrieves enrollment data 296 from an enrollment database 295 to determine if the merchant associated with merchant identifier 234 is already enrolled in the account updating program. If the merchant associated with merchant identifier 234 is already enrolled in the account updating program, AEBU computing device 220 may generate and transmit an AEBU response message 260 to acquirer 208 that includes the merchant enrollment status in response data 262 AEBU computing device 220 may further retrieve, from account database 290, updated account data 264 for a set of account identifiers and include updated account data 264 in AEBU response message 260.

In the example embodiment, merchant identifier 234 "ACME CO" may not be found in enrollment data 296, and AEBU computing device 220 determines the merchant is not already enrolled in the account updating program. In response, AEBU computing device 220 retrieves transaction data 270 from a transaction database 280. Transaction data 270 includes one or more combinations of an acquirer ICA number and merchant identifier AEBU computing device 220 identifies a merchant enrollee by identifying a merchant from transaction data 270 that is associated with an acquirer ICA number/merchant identifier combination that matches the acquirer ICA number 232/merchant identifier 234 combination included in account update request 230. AEBU computing device 220 is further configured to automatically enroll the merchant enrollee into the account updating program. In some embodiments, AEBU computing device 220 is configured to update enrollment database 295 with data associated with the newly enrolled merchant. In some embodiments, AEBU computing device 220 may generate an AEBU merchant identifier for the merchant enrollee. The AEBU merchant identifier may be used in future account update requests and may be stored with other merchant data in enrollment database 295.

For example, upon receiving account update request 230 including acquirer identifier 232 "1234" and merchant identifier 234 "ACME CO", AEBU computing device 220 retrieves transaction data 270 for an acquirer ICA number/merchant identifier combination that correlates with the "1234"/"ACME CO" combination in account update request 230. AEBU computing device 220 identifies "ACME CO" as the merchant enrollee and enrolls "ACME CO" in the account updating program AEBU computing device 220 may also generate an AEBU merchant identifier for "ACME CO", and further update enrollment database 295 with data associated with merchant enrollee "ACME CO".

AEBU computing device 220 is configured to generate and transmit AEBU response message 260 to requesting acquirer 208. AEBU response message 260 includes response data 262 that may include, for example, notice of successful enrollment of the merchant enrollee in the account updating program. Response data 262 may also include an AEBU merchant identifier that may be used in future account update requests. If a correlating acquirer ICA number/merchant identifier combination is not found in the transaction data (e.g., if a merchant enrollee is not identified), response data 262 may include notice of rejection of account update request 230. If a correlating acquirer ICA number/merchant identifier combination is found in the transaction data (e.g., if a merchant enrollee is identified), AEBU response message 260 may include updated account data 264. Updated account data 264 may include updated account data for a target set of account identifiers, wherein each member of the target set of merchant identifiers is both included in account update request 230 and is associated with the merchant enrollee in transaction data 270. Updated account data 264 may be retrieved from an account database 290.

For example, upon receiving account update request 230 and identifying "ACME CO" as the merchant enrollee, AEBU computing device 220 identifies account identifiers 5111111, 5666666, and 5777777 as the target set of account identifiers. AEBU computing device 220 may then retrieve updated account data 264 for account identifiers 5111111, 5666666, and 5777777 from account database 290 and include the updated account data 264 in AEBU response message 260.

Figure 3:
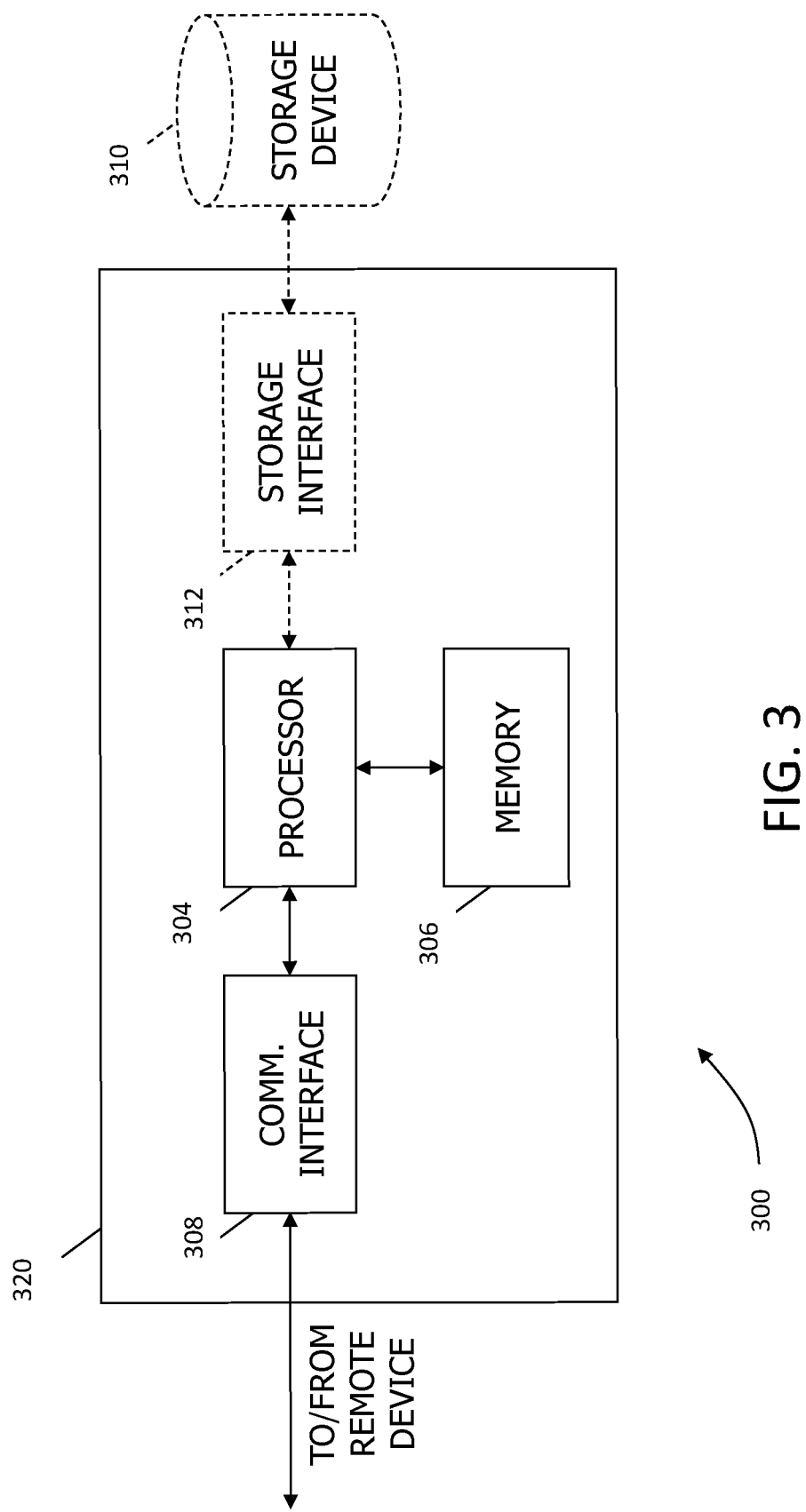

FIG. 3 illustrates an example configuration 300 of an AEBU computing device 320 that may be used with the systems shown in FIG. 1 and FIG. 2. AEBU computing device 320 includes a processor 304 for executing instructions. Instructions may be stored in a memory area 306, for example. Processor 304 may include one or more processing units (e.g., in a multi-core configuration).

Processor 304 is operatively coupled to a communication interface 308 such that AEBU computing device 320 is capable of communicating with a remote device such as an acquirer, a merchant, a cardholder, an issuer, or a payment processor. For example, communication interface 308 may transmit update request messages to acquirers via a network.

Processor 304 may also be operatively coupled to a storage device 310. Storage device 310 is any computer-operated hardware suitable for storing and/or retrieving data. In some embodiments, storage device 310 is integrated in AEBU computing device 320. For example, AEBU computing device 320 may include one or more hard disk drives as storage device 310. In other embodiments, storage device 310 is external to AEBU computing device 320 and may be accessed by a plurality of server computer devices. For example, storage device 310 may include multiple storage units such as hard disks or solid state disks in a redundant array of inexpensive disks (RAID) configuration. Storage device 310 may include a storage area network (SAN) and/or a network attached storage (NAS) system.

In some embodiments, processor 304 is operatively coupled to storage device 310 via a storage interface 312. Storage interface 312 is any component capable of providing processor 304 with access to storage device 310. Storage interface 312 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 304 with access to storage device 310.

Memory area 306 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 4:
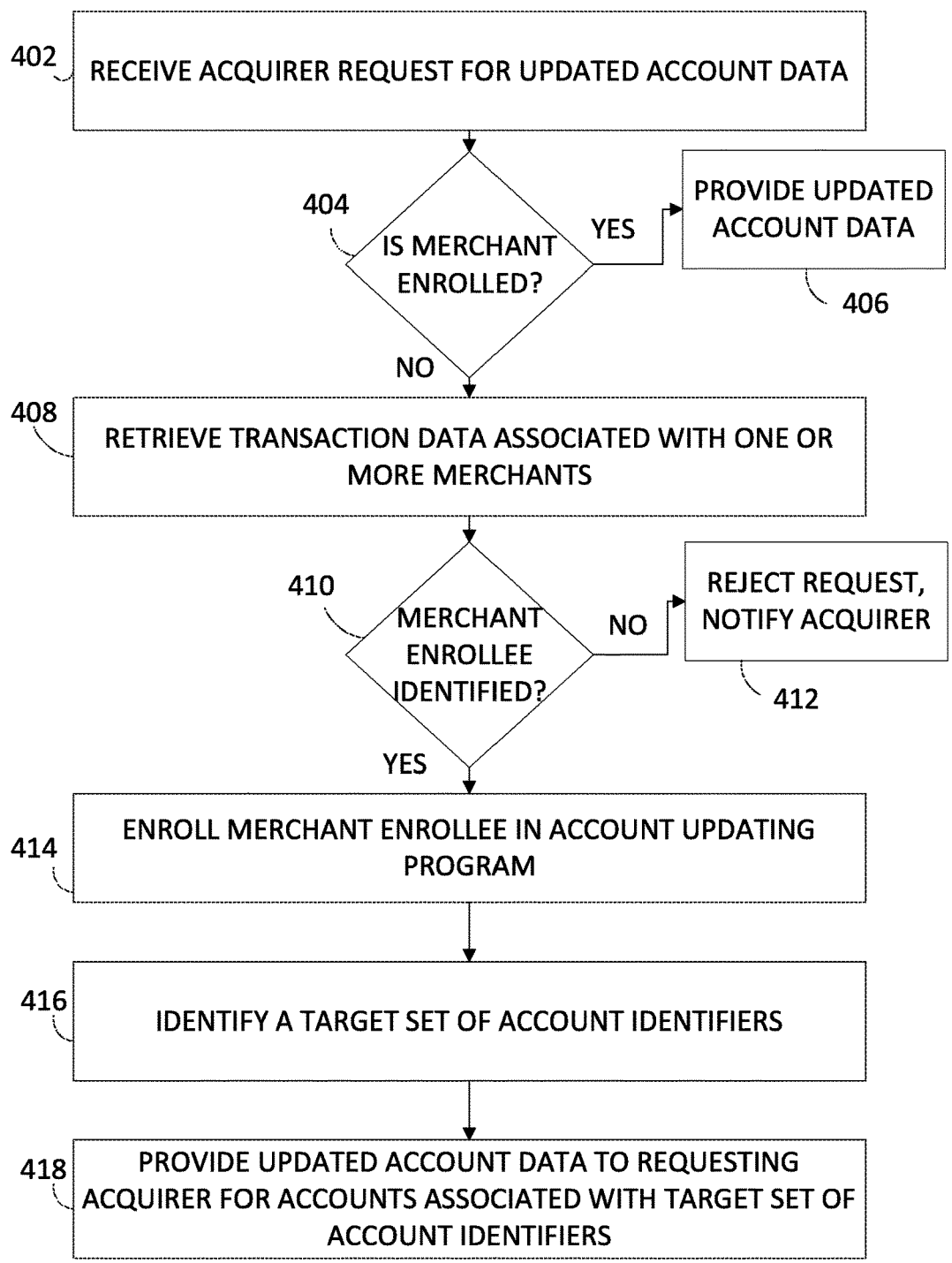

FIG. 4 is a flowchart of a method 400 for automatically enrolling merchants in an account updating program. In the example embodiment, method 400 is performed by an AEBU computing device, such as AEBU computing device 220 (shown in FIG. 2). In certain embodiments, method 400 may at least be partially performed by a different computing device. In other embodiments, method 400 may include additional, fewer, or alternative actions, including those described herein.

In method 400, the AEBU computing device receives 402 an acquirer request for updated account data. The request may include, for example, an acquirer identifier, a merchant identifier, and a list of account identifiers. In one embodiment, the AEBU computing device determines 404 if the merchant associated with the merchant identifier is already enrolled in an account updating program. If the merchant is determined to be enrolled, the requested updated account data may be transmitted 406 to the acquirer. If the merchant is not enrolled in an account updating program, the AEBU computing device retrieves 408 transaction data associated with one or more merchants. The transaction data may include one or more combinations of an acquirer identifier and merchant identifier.

The AEBU computing device attempts to identify 410 a merchant enrollee by determining a merchant from the transaction data associated with an acquirer identifier/merchant identifier combination that correlates with the acquirer identifier/merchant identifier combination included in the request. If a merchant enrollee is not identified, the AEBU computing device rejects 412 the account update request and transmits an AEBU response message notifying the requesting acquirer of the rejection. If a merchant enrollee is identified, the AEBU computing device automatically enrolls 414 the merchant enrollee into the account updating program. The AEBU computing device may be further configured to identify 416 a target set of account identifiers wherein each member of the target set of account identifiers is included in the account update request and is associated with the merchant enrollee in the transaction data. The AEBU computing device may be further configured to provide 418 the requesting acquirer with updated account data for accounts associated with the target set of account identifiers, and notification of merchant enrollment into the account updating program.

As will be appreciated based on the foregoing specification, the above-described examples of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed examples of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

This written description uses examples to describe embodiments of the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An auto-enrollment billing updater (AEBU) computing device for enrolling enrollees in an automatic updating program, said AEBU computing device comprising one or more processors in communication with one or more memory devices, said AEBU computing device configured to:
    receive, from an acquirer computing device, an account update request for updated account data, the account update request including an input acquirer identifier and an input merchant identifier;
    perform a lookup within a transaction database using a combination of the input acquirer identifier and the input merchant identifier, wherein the transaction database includes transaction data involving a plurality of cardholders and a plurality of merchants;
    identify as a merchant enrollee the merchant included within the transaction database having a stored acquirer identifier and a stored merchant identifier combination that matches the input acquirer identifier and the input merchant identifier combination included in the request;
    automatically enroll the merchant enrollee in the automatic updating program when the merchant enrollee is identified;
    generate an AEBU merchant identifier for the merchant enrollee;
    automatically update an enrollment database with data associated with the merchant enrollee, wherein the data associated with the merchant enrollee includes the AEBU merchant identifier;
    map the AEBU merchant identifier to each merchant identifier in the transaction database that is associated with the merchant enrollee and that is also associated with the input acquirer identifier; and
    transmit a response message to the acquirer computing device that includes the AEBU merchant identifier.

2. The device in accordance with claim 1 further configured to search the enrollment database to determine whether the merchant associated with the input merchant identifier in the account update request is already enrolled in the automatic updating program.

3. The device in accordance with claim 1 further configured to transmit a response message to the acquirer computing device that rejects the account update request when the merchant enrollee is unable to be identified by the AEBU computing device.

4. The device in accordance with claim 1 further configured to transmit a response message to the acquirer computing device that includes a notice of successful enrollment of the merchant enrollee in the automatic updating program.

5. The device in accordance with claim 1 further configured to:
    receive a set of account identifiers as part of the account update request;
    identify a target set of account identifiers in the transaction database by determining account identifiers associated with both the merchant enrollee and the account update request; and
    transmit a response message to the acquirer computing device that includes updated account data for accounts associated with the target set of account identifiers.

6. The device in accordance with claim 1 wherein the transaction database stores transactions as rows and associated searchable key variables are stored as columns, wherein the key variables include at least the stored merchant identifier and the stored acquirer identifier, and wherein the combination of the stored merchant identifier and the stored acquirer identifier uniquely identify a merchant involved in the corresponding transaction.

7. A computer-implemented method for enrolling entities in an automatic updating program, said method implemented using an auto-enrollment billing updater (AEBU) computing device, said method comprising:
   receiving, by the AEBU computing device, an account update request for updated account data, the account update request including an input acquirer identifier and an input merchant identifier;
   performing a lookup within a transaction database using a combination of the input acquirer identifier and the input merchant identifier, wherein the transaction database includes transaction data involving a plurality of cardholders and a plurality of merchants;
   identifying, by the AEBU computing device, as a merchant enrollee the merchant included within the transaction database having a stored acquirer identifier and a stored merchant identifier combination that matches the input acquirer identifier and the input merchant identifier combination included in the request;
   automatically enrolling, by the AEBU computing device, the merchant enrollee in the automatic updating program when the merchant enrollee is identified;
   generating an AEBU merchant identifier for the merchant enrollee;
   automatically updating an enrollment database with data associated with the merchant enrollee, wherein the data associated with the merchant enrollee includes the AEBU merchant identifier;
   mapping the AEBU merchant identifier to each merchant identifier in the transaction database that is associated with the merchant enrollee and that is also associated with the input acquirer identifier; and
   transmitting a response message to the acquirer computing device that includes the AEBU merchant identifier.

8. The method in accordance with claim 7 further comprising searching the enrollment database to determine whether the merchant associated with the input merchant identifier in the account update request is already enrolled in the automatic updating program.

9. The method in accordance with claim 7 further comprising transmitting a response message to the acquirer computing device that rejects the account update request when the merchant enrollee is unable to be identified by the AEBU computing device.

10. The method in accordance with claim 7 further comprising transmitting a response message to the acquirer computing device that includes a notice of successful enrollment of the merchant enrollee in the automatic updating program.

11. The method in accordance with claim 7 further comprising:
   receiving a set of account identifiers as part of the account update request;
   identifying a target set of account identifiers in the transaction database by determining account identifiers associated with both the merchant enrollee and the account update request; and
   transmitting a response message to the acquirer computing device that includes updated account data for accounts associated with the target set of account identifiers.

12. The method in accordance with claim 7 wherein the transaction database stores transactions as rows and associated searchable key variables are stored as columns, wherein the key variables include at least the stored merchant identifier and the stored acquirer identifier, and wherein the combination of the stored merchant identifier and the stored acquirer identifier uniquely identify a merchant involved in the corresponding transaction.

13. A non-transitory computer readable medium that includes computer-executable instructions for enrolling entities in an automatic updating program, wherein when executed by at least one processor of an auto-enrollment billing updater (AEBU) computing device, the computer executable instructions cause the at least one processor to:
   receive, from an acquirer computing device, an account update request for updated account data, the account update request including an input acquirer identifier and an input merchant identifier;
   perform a lookup within a transaction database using a combination of the input acquirer identifier and the input merchant identifier, wherein the transaction database includes transaction data involving a plurality of cardholders and a plurality of merchants;
   identify as a merchant enrollee the merchant included within the transaction database having a stored acquirer identifier and a stored merchant identifier combination that matches the input acquirer identifier and the input merchant identifier combination included in the request;
   automatically enroll the merchant enrollee in the automatic updating program when the merchant enrollee is identified;
   generate an AEBU merchant identifier for the merchant enrollee;
   automatically update an enrollment database with data associated with the merchant enrollee, wherein the data associated with the merchant enrollee includes the AEBU merchant identifier;
   map the AEBU merchant identifier to each merchant identifier in the transaction database that is associated with the merchant enrollee and that is also associated with the input acquirer identifier; and
   transmit a response message to the acquirer computing device that includes the AEBU merchant identifier.

14. The non-transitory computer readable medium of claim 13, wherein the computer-executable instructions further cause the at least one processor to search the enrollment database to determine whether the merchant associated with the input merchant identifier in the account update request is already enrolled in the automatic updating program.

15. The non-transitory computer readable medium of claim 13, wherein the computer-executable instructions further cause the at least one processor to transmit a response message to the acquirer computing device that rejects the account update request when the merchant enrollee is unable to be identified by the AEBU computing device.

16. The non-transitory computer readable medium of claim 13, wherein the computer-executable instructions further cause the at least one processor to transmit a response message to the acquirer computing device that includes a notice of successful enrollment of the merchant enrollee in the automatic updating program.

17. The non-transitory computer readable medium of claim 13, wherein the computer-executable instructions further cause the at least one processor to:
   receive a set of account identifiers as part of the account update request;

identify a target set of account identifiers in the transaction database by determining account identifiers associated with both the merchant enrollee and the account update request; and transmit a response message to the acquirer computing device that includes updated account data for accounts associated with the target set of account identifiers.

\* \* \* \* \*